United States Patent
Kim et al.

(10) Patent No.: US 10,471,529 B2
(45) Date of Patent: Nov. 12, 2019

(54) ELECTRICAL DISCHARGE MACHINING DEVICE AND METHOD FOR THE SAME

(71) Applicant: Foundation of Soongsil University-Industry Cooperation, Seoul (KR)

(72) Inventors: Bo Hyun Kim, Seoul (KR); Pyeong An Lee, Seoul (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 488 days.

(21) Appl. No.: 15/291,657

(22) Filed: Oct. 12, 2016

(65) Prior Publication Data
US 2017/0100793 A1 Apr. 13, 2017

(30) Foreign Application Priority Data

Oct. 13, 2015 (KR) .................. 10-2015-0142663
Dec. 17, 2015 (KR) .................. 10-2015-0180708

(51) Int. Cl.
*B23H 7/38* (2006.01)
*B23H 7/30* (2006.01)
*B23H 1/00* (2006.01)

(52) U.S. Cl.
CPC .............. *B23H 7/38* (2013.01); *B23H 7/30* (2013.01); *B23H 1/00* (2013.01); *B23H 2400/00* (2013.01)

(58) Field of Classification Search
CPC ... B23H 7/38; B23H 7/28; B23H 7/14; B23H 2400/00
USPC ......... 219/69.11, 69.12, 69.13, 69.14, 69.17, 219/69.18
See application file for complete search history.

(56) References Cited

U.S. PATENT DOCUMENTS 3,059,150 A * 10/1962 Colten .................. B23H 7/18
204/224 M
3,072,777 A * 1/1963 McKechnie ........... B23H 9/001
219/69.2

FOREIGN PATENT DOCUMENTS

| JP | H03-60928 A | 3/1991 |
| JP | H10-315052 A | 12/1998 |
| KR | 10-0249327 B1 | 4/2000 |
| KR | 10-2014-0056555 A | 5/2014 |
| KR | 10-2014-0084317 A | 7/2014 |

* cited by examiner

*Primary Examiner* — Thien S Tran
(74) *Attorney, Agent, or Firm* — Novick, Kim & Lee, PLLC; Sang Ho Lee

(57) ABSTRACT

An electrical discharge machining device for processing a workpiece by electrical discharges generated between a tool and the workpiece is provided. The electrical discharge machining device includes an electric discharger applying electric power to the tool and the workpiece to process the workpiece, and a vibration generator applying a vibration to the tool or the workpiece using a first voltage generated between the tool and the workpiece during a time when the workpiece is processed.

6 Claims, 4 Drawing Sheets

ELECTRICAL DISCHARGE MACHINING DEVICE AND METHOD FOR THE SAME

CROSS-REFERENCE TO RELATED APPLICATION

This application claims priority to and the benefit of Korean Patent Application Nos. 10-2015-0142663 and 10-2015-0180708, filed on Oct. 13, 2015, and Dec. 17, 2015, respectively, and the disclosures thereof are incorporated herein by reference in their entirety.

BACKGROUND

The present invention relates to an electrical discharge machining device and machining method for the same, and more particularly, to the electrical discharge machining device and the method thereof using vibrations applied to a workpiece or a tool.

Electrical discharge process refers to a method of processing a workpiece by respectively connecting a negative (−) electrode and a positive (+) electrode to a tool and a workpiece in a dielectric liquid to apply a voltage and producing sparks between the tool and the workpiece while performing recurring electrical discharges. Such electrical discharge machining allows accurate machining even for a solid material.

Meanwhile, process fragments (debris material removed from a workpiece) are generated and drift in a dielectric liquid when a workpiece is processed by electrical discharge machining. Particularly, the process fragments existing on a surface of a workpiece being processed may cause a short circuit and hinder electrical discharges or may deform a spark form and thereby degrade the process, and thus the process fragments existing on a surface of a workpiece need to be removed.

Although a method has been proposed for removing such process fragments existing on a surface of a workpiece by applying vibrations to a workpiece or tool when performing electrical discharge machining, a problem is its inefficiency in terms of energy consumption because the vibrations are applied even when the workpiece is not being processed.

SUMMARY OF THE INVENTION

According to one embodiment of the present disclosure, an electrical discharge machining device for processing a workpiece by electrical discharges generated between a tool and the workpiece is provided. The electrical discharge machining device includes an electric discharger applying electric power to the tool and the workpiece to process the workpiece, and a vibration generator applying a vibration to the tool or the workpiece using a first voltage generated between the tool and the workpiece during a time when the workpiece is processed.

The electric discharger includes a power supply supplying the electric power and a processing part applying the electric power supplied from the power supply to the tool and the workpiece. A resistor is provided between the power supply and the processing part.

The vibration generator is connected to both terminals of the resistor provided between the power supply and the processing part to apply the vibration to the tool and the workpiece using a second voltage at the resistor.

The vibration generator includes an amplifier amplifying the first voltage generated between the tool and the workpiece during the time when the workpiece is processed, and an actuator receiving the amplified first voltage from the amplifier and generates a vibration.

The actuator is installed at an electrical discharge machining tank in which the tool or the workpiece is located and receives a pulse signal from the amplifier to apply the vibration to the tool or the workpiece.

The actuator applies the vibration to the tool or the workpiece in a direction approaching or being spaced apart from each other.

According to another embodiment of the present disclosure, a method for electrical discharge machining processing for processing a workpiece by electrical discharges generated between a tool and the workpiece is provided. The method includes applying electric power to the tool and the workpiece to process the workpiece, and applying a vibration to the tool or the workpiece using a first voltage generated between the tool and the workpiece during a time when the workpiece is processed.

The step of the applying of the vibration to the tool or the workpiece using the voltage generated between the tool and the workpiece during a time when the workpiece is processed further includes generating a vibration using a second voltage at a resistor connected to the workpiece in series as an input voltage and applying the vibration to the tool or the workpiece.

The step of the applying of the vibration to the tool or the workpiece using the voltage generated between the tool and the workpiece during the time when the workpiece is processed includes amplifying the second voltage at the resistor connected to the workpiece in series to transmit the amplified second voltage to an actuator installed at an electrical discharge machining tank in which the tool or the workpiece is located, and generating a vibration by the actuator using the amplified second voltage to apply the vibration to the electrical discharge machining tank in which the tool or the workpiece is located.

The step of the applying the vibration to the tool or the workpiece using the first voltage generated between the tool and the workpiece during the time when the workpiece is processed further includes applying the vibration to the tool or the workpiece in a direction approaching or being spaced apart from each other.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
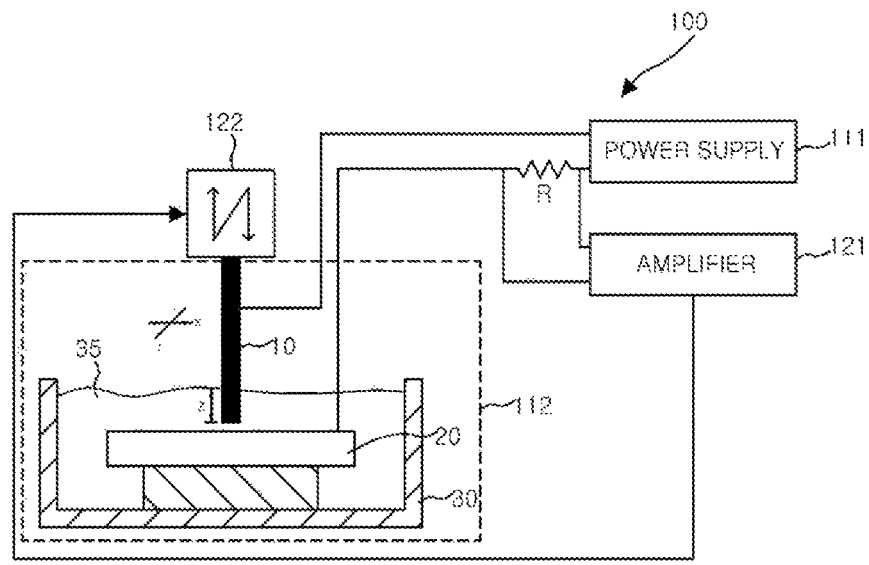
FIG. 1 is a block diagram illustrating an example of processing a workpiece using an electrical discharge machining device according to one embodiment of the present disclosure.

In the detailed descriptions of the present disclosure to be described below, some particular embodiments that may be implemented from the present disclosure will be described as exemplars with reference to the accompanying drawings. The embodiments will be described fully in detail so that those skilled in the art may implement the present disclosure. It should be understood that various embodiments of the present disclosure may be different from each other, but the different embodiments need not be mutually exclusive. For example, particular shapes, structures and properties related to one embodiment described herein may be implemented in another embodiment without departing from the sprit and scope of the present disclosure. In addition, it should be understood that a position and disposition of individual element in each embodiment disclosed may be modified without departing from the sprit and scope of the present disclosure. Therefore, the detailed descriptions to be described below are not intended to be taken in a limited sense, but the scope of the present disclosure shall only be limited according to the claims below and equivalent scope thereof when described properly. In understanding the drawings, like reference numerals indicate the same or similar functions for various applications.

Hereinafter, exemplary embodiments of the present disclosure will be described with reference to the accompanying drawings in detail.

FIG. 1 is a block diagram illustrating an example of processing a workpiece using an electrical discharge machining apparatus according to one embodiment of the present disclosure.

Referring to FIG. 1, an electrical discharge machining device 100 according to one embodiment of the present disclosure may include an electrical discharger 110 configured with a power supply 111 and a processing part 112, and a vibration generator 120 configured with an amplifier 121 and an actuator 122.

The processing part 112 may process a workpiece 20 by applying electric power supplied from the power supply 111 to a tool 10 and the workpiece 20 which are submerged in a dielectric liquid 35 and producing sparks due to electrical discharges between the tool 10 and the workpiece 20.

Here, the tool 10 is a conductive material and may process the workpiece 20 in the same shape as the tool 10 while moving in an x-axis, y-axis, or z-axis direction by a driving unit (not shown) with a space between the tool 10 and a surface of the workpiece 20 being processed. The workpiece 20 is a conductive material and may be installed in an electrical discharge machining tank 30 with the workpiece 20 completely submerged in the dielectric liquid 35. The dielectric liquid 35 may be kerosene or deionized water and may be stored in the electrical discharge machining tank 30.

In addition, the amplifier 121 may drive the actuator 122 in an electrical discharge machining process using a first voltage generated between the tool 10 and the workpiece 20. To this end, the amplifier 121 may be connected to both terminals of a resistor R provided between the power supply 111 and the processing part 112.

Here, the actuator 122 may be installed at the tool 10 and receive pulse signals from the amplifier 121 to vibrate the tool 10 in a z-axis direction.

Figure 2:
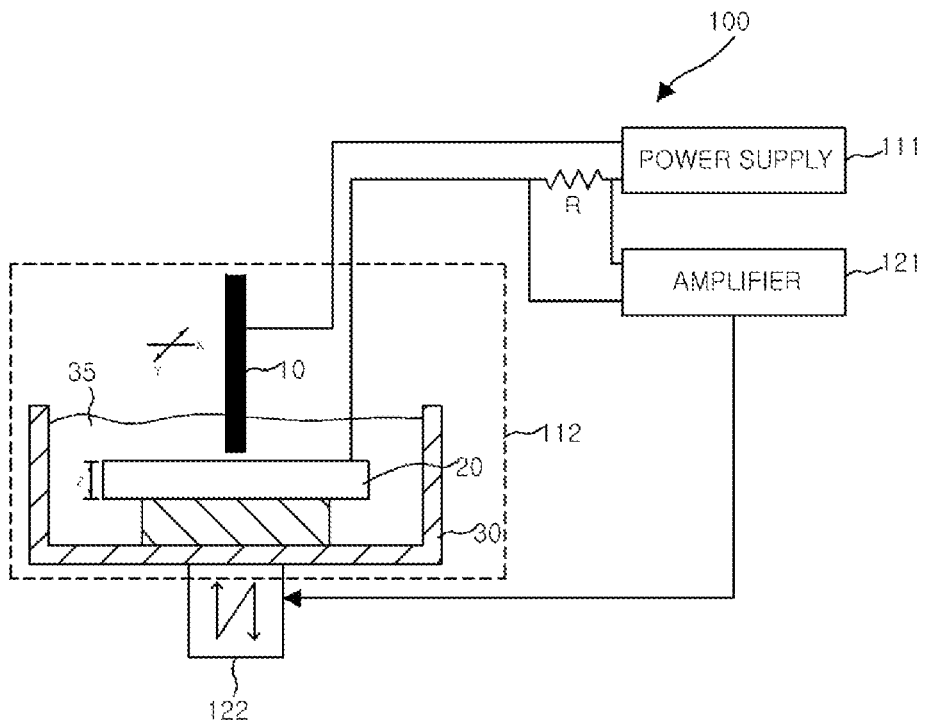
FIG. 2 is a block diagram illustrating another example of processing a workpiece using an electrical discharge machining apparatus according to one embodiment of the present disclosure.

In addition, the electrical discharge machining apparatus 100 according to one embodiment of the present disclosure may have the actuator 122 installed at the electrical discharge machining tank 30 as illustrated in FIG. 2. In this case, the actuator 122 may vibrate the electrical discharge machining tank 30 to apply vibrations to the workpiece 20 installed in the electrical discharge machining tank 30.

Figure 3:
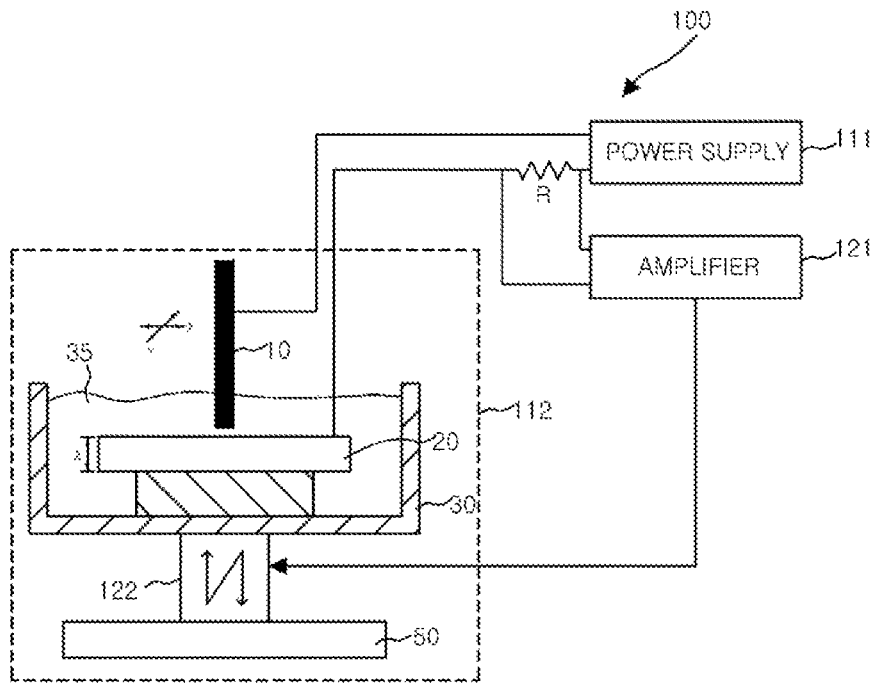
FIG. 3 is a block diagram illustrating still another example of processing a workpiece using an electrical discharge machining apparatus according to one embodiment of the present disclosure.

Alternatively, the electrical discharge machining apparatus 100 according to one embodiment of the present disclosure may have the actuator 122 installed between the electrical discharge machining tank 30 and a stage 50 as illustrated in FIG. 3. In this case, the actuator 122 may vibrate the electrical discharge machining tank 30 to apply vibrations to the workpiece 20 installed in the electrical discharge machining tank 30. Here, the stage 50 is generally installed under the electrical discharge machining tank 30 to move the workpiece 20 in an x-axis or y-axis direction.

As described above, the electrical discharge machining apparatus 100 according to one embodiment of the present disclosure includes the electric discharger 110 and the vibration generator 120 and may apply vibrations having amplitude depending on the first voltage level generated between the tool 10 and the workpiece 20 to the tool 10 or the workpiece 20 in the electrical discharge machining process.

Hereinafter, a configuration of the electrical discharge machining apparatus 100 according to one embodiment of the present disclosure will be described with reference to FIGS. 4 and 5 in detail.

Figure 4:
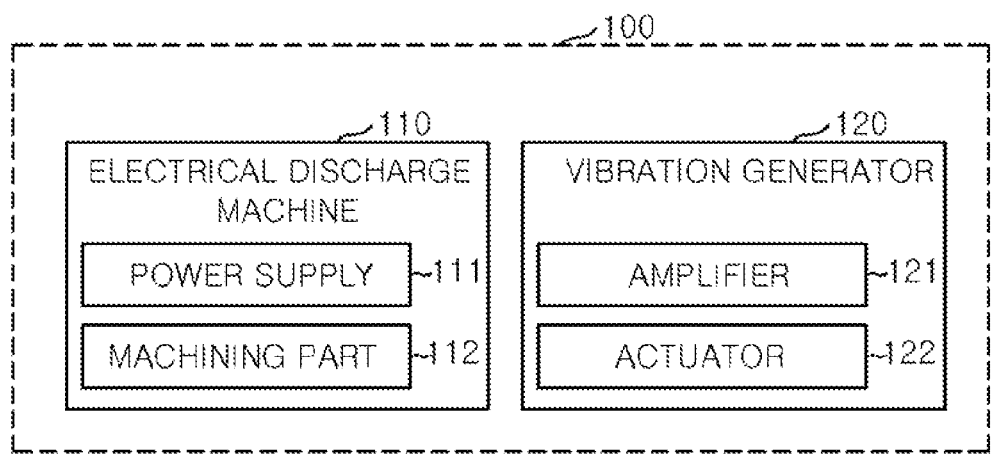
FIG. 4 is a control block diagram of an electrical discharge machining apparatus according to one embodiment of the present disclosure.
Figure 5:
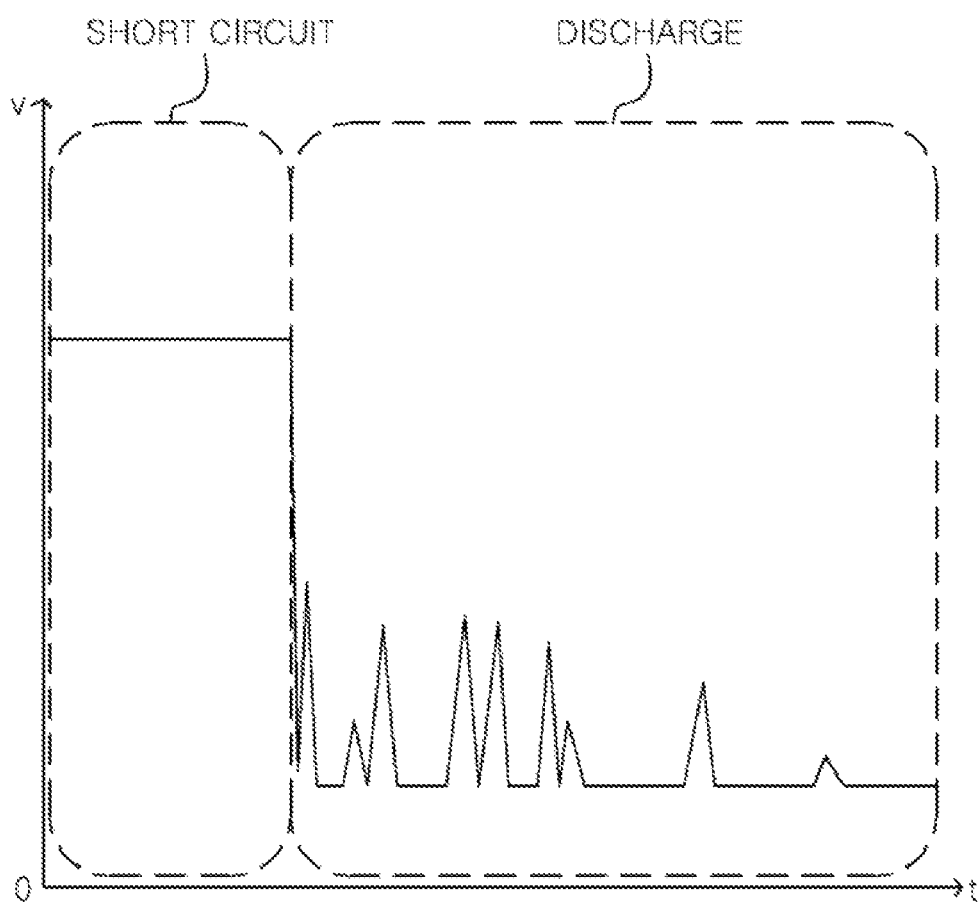
FIG. 5 is an example of a graph of first voltage generated between a tool and a workpiece while processing the workpiece.

FIG. 4 is a control block diagram of the electrical discharge machining apparatus according to one embodiment of the present disclosure, and FIG. 5 is an example of a graph of first voltage generated between the tool and a workpiece while processing the workpiece.

Referring to FIG. 4, the electrical discharge machining apparatus 100 according to one embodiment of the present disclosure may include the electric discharger 110 and the vibration generator 120. The electrical discharge machining apparatus 100 according to one embodiment of the present disclosure may be implemented by more or fewer components than the components illustrated in FIG. 4. Hereinafter, the above-described components will be described in detail.

The electric discharger 110 may include a power supply 111 and a processing part 112 and may perform the electrical discharge machining by applying electric power supplied from the power supply 111 to the processing part 112.

Here, the power supply 111 may supply predetermined electric power for performing the electrical discharge machining and, to this end, may be provided as an electrical discharge circuit including a power supply unit and predetermined resistor and capacitor (RC) components.

In addition, referring to FIGS. 1 to 3, the processing part 112 may include the tool 10, the driving unit (not shown) which drives the tool 10, the workpiece 20, the electrical discharge machining tank 30, the dielectric liquid 35 stored in the electrical discharge machining tank 30, and may further include the stage 50 installed under the electrical discharge machining tank 30. In addition, the processing part 112, as described above, may process a workpiece 20 by applying electric power supplied from the power supply 111 to a tool 10 and the workpiece 20 which are submerged in the dielectric liquid 35 and producing sparks due to electrical discharges between the tool 10 and the workpiece 20.

Specifically, a negative (−) electrode of the power supply 111 is connected to the tool 10, and a positive (+) electrode of the power supply 111 is connected to the workpiece 20 in the processing part 112, and thereby the electric discharger 110 may supply the electric power supplied from the power supply 111 to the tool 10 and the workpiece 20. That is, the electric discharger 110 may produce the electrical discharges between the tool 10 and the workpiece 20 by respectively connecting different electrodes to the tool 10 and the workpiece 20 which are disposed to be spaced a predetermined distance from each other in the dielectric liquid 35 and supplying electric power through the electrodes, and may process the workpiece 20 by the sparks generated by the electrical discharge.

Meanwhile, referring to FIGS. 1 to 3, the resistor R may be provided between the power supply 111 and the processing part 112. Here, a second voltage applying to the resistor R may vary depending on the first voltage level generated between the tool 10 and the workpiece 20 during the electrical discharge machining.

Specifically, referring to FIG. 5, when the tool 10 and a surface of the workpiece 20 being processed are in contact with each other while processing the workpiece 20, a short circuit occurs and a consequent first voltage generated between the tool 10 and the workpiece 20 may have the maximum value of the first voltage levels generated while processing the workpiece 20. On the other hand, when the tool 10 and the workpiece 20 are spaced by a predetermined distance in the dielectric liquid 35, electrical discharges may occur and consequent discharge voltages may be generated. Here, the discharge voltages between the tool 10 and the workpiece 20 may vary in the range of 0 V to the maximum value of the first voltage due to the short circuit.

Therefore, when the workpiece 20 and the resistor R included in the processing part 112 are connected in series, the second voltage applying to the resistor R may have the maximum voltage value when short-circuited while processing the workpiece 20, and may vary in proportion to levels of the discharge voltages when the electrical discharges are produced between the tool 10 and the workpiece 20 which are spaced by a predetermined distance in the dielectric liquid 35.

The vibration generator 120 may apply vibrations to the tool 10 and the workpiece 20 while processing the workpiece 20 using the first voltage generated between the tool 10 and the workpiece 20, and may include the amplifier 121 and the actuator 122.

The amplifier 121 may use the second voltage applying to the resistor R as an input voltage, amplify the input voltage to a level required to drive the actuator 122 using various known methods, and, to this end, the amplifier 121 may be connected to both terminals of the resistor R provided between the power supply 111 and the processing part 112 to receive the first voltage generated between the tool 10 and the workpiece 20 while processing the workpiece 20, and may include an active component such as a vacuum tube or a transistor.

Specifically, as described above, the second voltage applying to the resistor R connected to the workpiece 20 in series may have the maximum voltage value when short-circuited while processing the workpiece 20 and may vary in proportion to levels of the discharge voltages when the electrical discharges are produced between the tool 10 and the workpiece 20 which are spaced by a predetermined distance in the dielectric liquid 35.

The amplifier 121 may use the second voltage applying to the resistor R as an input voltage, amplify the input voltage to a level required to drive the actuator 122, and transmit the amplified voltage to the actuator 122.

The actuator 122 may be installed at the tool 10 or the workpiece 20, and may apply vibrations to the tool 10 or the workpiece 20 using pulse signals received from the amplifier 121. To this end, the amplifier 121 may be configured with a piezoelectric element including lead zirconate titanate (PZT) in which mechanical deformation occurs when an electric signal is applied.

Specifically, the actuator 122 may be directly installed at the tool 10 or at the driving unit (not shown) which drives the tool 10. Alternatively, the actuator 122 may be directly installed at the workpiece 20 or at the electrical discharge machining tank 30 in which the workpiece 20 is fixed. In conclusion, the actuator 122 may be installed at the tool 10 or the workpiece 20 to apply vibrations to the tool 10 or the workpiece 20 in a direction of approaching and being spaced from each other (in a z-axis direction).

As described above, the electrical discharge machining apparatus 100 according to one embodiment of the present disclosure applies the electric power to the tool 10 and the workpiece 20 so that the electrical discharges are generated between the tool 10 and the workpiece 20, and may apply vibrations to the tool 10 or the workpiece 20 using the first voltage generated between the tool 10 and the workpiece 20 during the electrical discharge machining.

Hereinafter, a method of the electrical discharge machining according to one embodiment of the present disclosure will be described with reference to FIG. 6.

Figure 6:
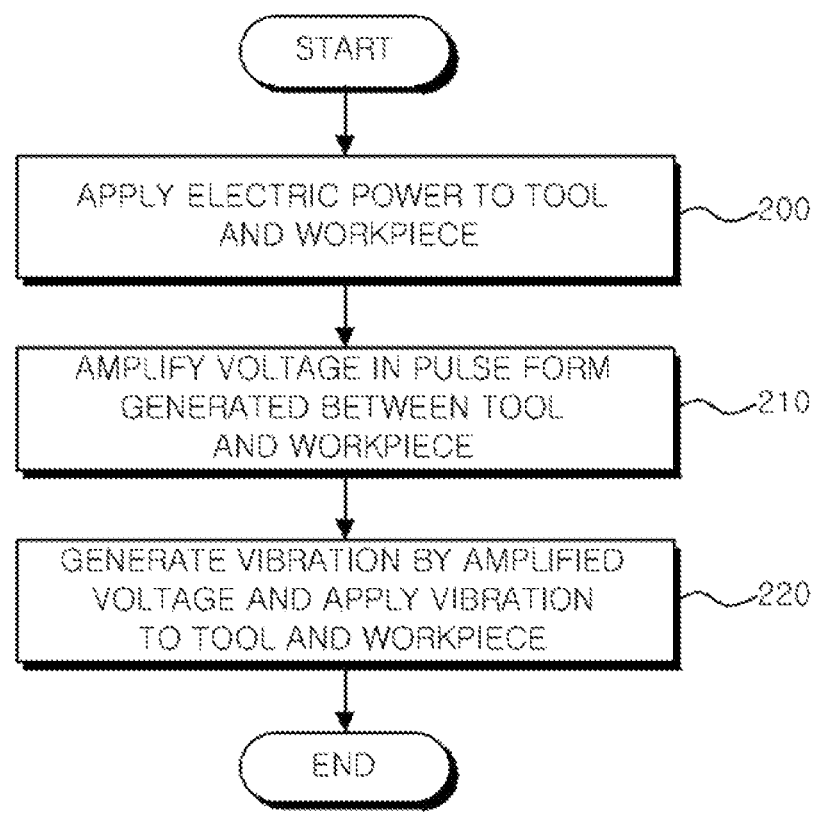
FIG. 6 is a flowchart for describing a method of electrical discharge machining according to one embodiment of the present disclosure.

FIG. 6 is a flowchart for describing a method of the electrical discharge machining according to one embodiment of the present disclosure.

The method of electrical discharge machining according to one embodiment of the present disclosure may be proceeded by substantially the same configuration as the electrical discharge machining apparatus 100 illustrated in FIG. 4. The same reference numbers will be marked for the same elements as the electrical discharge machining apparatus 100 of FIG. 4, and duplicated descriptions thereof will be omitted.

Referring to FIG. 6, the method of electrical discharge machining according to one embodiment of the present disclosure may first apply electric power to the tool 10 and the workpiece 20 (S200).

In addition, the method of electrical discharge machining may amplify the first voltage in a pulse type generated between the tool 10 and the workpiece 20 while processing the workpiece 20 (S210).

In addition, the method of electrical discharge machining may generate vibrations by the amplified voltage and apply the vibrations to the tool or the workpiece (S220).

Specifically, by the electric discharger 110, the electric power supplied from the power supply 111 is applied to the processing part 112 to generate the electric discharges between the tool 10 and the workpiece 20 which are included in the processing part 112, and the workpiece 20 may be processed by the sparks due to the electrical discharges.

In addition, by the vibration generator 120, a vibration may be applied to the tool 10 and the workpiece 20 using the first voltage generated between the tool 10 and the workpiece 20 during the electrical discharge machining. To this end, the amplifier 121 included in the vibration generator 120 may amplify the first voltage generated between the tool 10 and the workpiece 20 during the electrical discharge machining to a level required to drive the actuator 122 and transmit the amplified voltage to the actuator 122. In addition, the actuator 122 included in the vibration generator 120 may be installed in the electrical discharge machining tank 30 in which the tool 10 or workpiece 20 is installed, and may apply vibrations to the tool 10 or the workpiece 20 depending on pulses received from the amplifier 121.

As described above, the method of electrical discharge machining according to one embodiment of the present disclosure may not require a separate input power for applying vibrations because the vibrations are applied to the tool 10 or the workpiece 20 using the first voltage generated between the tool 10 and the workpiece 20 while processing the workpiece 20 and is efficient in terms of energy consumption because the vibrations are applied only while processing the workpiece.

The method of electrical discharge machining described above may be implemented as an application or in a form of program commands which may be executed through diverse components of a computer, and the application or the program commands may be recorded in a computer-readable recording medium. The computer-readable recording medium may include one or a combination of program commands, data files, data structures, etc.

The program commands recorded in a computer-readable recording medium may be specially designed and formed for the present disclosure or may be program commands known to those skilled in the computer software field and available for use.

Examples of the computer-readable recording medium includes magnetic media such as a hard disk, a floppy disc, and a magnetic tape, optical media such as a compact disc read-only memory (CD-ROM) and digital video disc (DVD), magneto-optical media such as a floptical disk, and a hardware device specially configured to record and execute program commands such as a read-only memory (ROM), a random access memory (RAM), a flash memory, etc.

Examples of program commands include not only a device language code such as that produced by a complier but also a high-level language code which may be executed by a computer using an interpreter or the like. The hardware device may be formed to be operated as one or more software modules to perform the process according to the present disclosure.

An aspect of the present disclosure provides the apparatus and method for the electrical discharge machining which can apply vibrations to the workpiece or the tool using the first voltage generated between the tool and the workpiece during the electrical discharge machining, and thereby have an advantage of efficient energy consumption because the vibrations are applied only while processing the workpiece.

While the present disclosure has been described in connection with embodiments, it should be understood to those skilled in the art that various changes and modifications may be made therein without departing from the spirit and scope of the disclosure as defined by the appended claims.

What is claimed is:

1. An electrical discharge machining device for processing a workpiece by electrical discharges generated between a tool and the workpiece, the electrical discharge machining device comprising:

a power supply configured to supply electric power to the tool and the workpiece to process the workpiece, wherein a resistor is connected in series between the power supply and the workpiece;

an actuator configured to generate a vibration to be applied to the tool or the workpiece; and an amplifier connected to both terminals of the resistor to receive a first voltage generated between the tool and the workpiece during a time when the workpiece is processed, use a second voltage occurred at the resistor as an input voltage, amplify the input voltage to a level required to drive the actuator, and transmit the amplified input voltage to the actuator to apply the vibration to the tool or the workpiece.

2. The electrical discharge machining device of claim 1, wherein the actuator is installed at an electrical discharge machining tank in which the tool or the workpiece is located and receives a pulse signal from the amplifier to apply the vibration to the tool or the workpiece.

3. The electrical discharge machining device of claim 1, wherein the actuator applies the vibration to the tool or the workpiece in a direction approaching or being spaced apart from each other.

4. A method for electrical discharge machining processing for processing a workpiece by electrical discharges generated between a tool and the workpiece, the method comprising:

supplying, by a power supply, electric power to the tool and the workpiece to process the workpiece;

receiving a first voltage generated between the tool and the workpiece during a time when the workpiece is processed;

using a second voltage, occurred at a resistor connected in series between the power supply and the workpiece, as an input voltage;

amplifying the input voltage to a level required to drive an actuator for generating a vibration to be applied to the tool or the workpiece;

transmitting the amplified input voltage to the actuator; and applying, by the actuator, the vibration to the tool or the workpiece.

5. The method of claim 4, wherein the actuator is installed at an electrical discharge machining tank in which the tool or the workpiece is located.

6. The method of claim 4, wherein the step of the applying the vibration, by the actuator, to the tool or the workpiece includes applying the vibration to the tool or the workpiece in a direction approaching or being spaced apart from each other.

* * * * *